US010725450B2

(12) United States Patent
Shinoda et al.

(10) Patent No.: US 10,725,450 B2
(45) Date of Patent: Jul. 28, 2020

(54) CONTROL SYSTEM OF MACHINE TOOL

(71) Applicant: FANUC CORPORATION, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 11 days.

(21) Appl. No.: 15/914,699

(22) Filed: Mar. 7, 2018

(65) Prior Publication Data
US 2018/0267505 A1 Sep. 20, 2018

(30) Foreign Application Priority Data

Mar. 14, 2017 (JP) .................. 2017-048903

(51) Int. Cl.
G05B 19/408 (2006.01)
G05B 19/418 (2006.01)
(Continued)

(52) U.S. Cl.
CPC ....... *G05B 19/4086* (2013.01); *B23Q 1/0009* (2013.01); *B23Q 17/20* (2013.01);
(Continued)

(58) Field of Classification Search
None
See application file for complete search history.

(56) References Cited

U.S. PATENT DOCUMENTS 5,768,137 A 6/1998 Polidoro et al.
5,871,391 A 2/1999 Pryor
(Continued)

FOREIGN PATENT DOCUMENTS

CA 2986736 A1 12/2018
CN 1211488 A 3/1999
(Continued)

OTHER PUBLICATIONS

An Office Action; "Notification of Reasons for Refusal," issued by the Japanese Patent Office and dated Sep. 25, 2018, which corresponds to Japanese Patent Application No. 2017-048903 and is related to U.S. Appl. No. 15/914,699.
(Continued)

*Primary Examiner* — Mohammad Ali
*Assistant Examiner* — Saad M Kabir
(74) *Attorney, Agent, or Firm* — Studebaker & Brackett PC

(57) ABSTRACT

A control system of a machine tool which machines a work includes: a numerical control device which controls the drive axis of the machine tool based on control data; a machined surface measurement device which measures the machined surface of the work; and a data processing device, and the data processing device includes a drive axis control data acquisition portion which acquires, from the numerical control device, the chronological control data when the work is machined; a machined surface measurement data acquisition portion which acquires spatial machined surface measurement data after the machining of the work measured by the machined surface measurement device; and a data-associating processing portion which associates the chronological control data acquired by the drive axis control data acquisition portion and the spatial machined surface measurement data acquired by the machined surface measurement data acquisition portion with each other.

8 Claims, 6 Drawing Sheets

(51) Int. Cl.
*B23Q 1/00* (2006.01)
*G01B 5/008* (2006.01)
*B23Q 17/20* (2006.01)
*B23Q 17/22* (2006.01)

(52) U.S. Cl.
CPC ......... *B23Q 17/2233* (2013.01); *G01B 5/008* (2013.01); *G05B 19/41825* (2013.01); *G05B 19/41875* (2013.01); *G05B 2219/35514* (2013.01); *G05B 2219/37197* (2013.01); *G05B 2219/37435* (2013.01); *Y02P 90/02* (2015.11)

(56) References Cited

U.S. PATENT DOCUMENTS

| | | |
|---|---|---|
| 6,449,526 B1 | 9/2002 | Sachs et al. |
| 2001/0024097 A1 | 9/2001 | Kunugi et al. |
| 2010/0057257 A1 | 3/2010 | Ichikawa |
| 2010/0207567 A1 | 8/2010 | Mori et al. |
| 2014/0087628 A1 | 3/2014 | Bharadwaj |
| 2014/0148939 A1* | 5/2014 | Nakano .............. G01B 11/2545 700/166 |
| 2014/0157610 A1* | 6/2014 | Garvey ................. G01B 21/04 33/503 |
| 2016/0054724 A1 | 2/2016 | Oda |
| 2017/0300034 A1 | 10/2017 | Nagaoka et al. |
| 2018/0133901 A1 | 5/2018 | Kuno |
| 2018/0267505 A1 | 9/2018 | Shinoda et al. |
| 2018/0275639 A1 | 9/2018 | Shinoda et al. |
| 2018/0307202 A1 | 10/2018 | Ikai et al. |

FOREIGN PATENT DOCUMENTS

| | | |
|---|---|---|
| CN | 101145047 A | 3/2008 |
| CN | 101722438 A | 6/2010 |
| CN | 101813931 A | 8/2010 |
| CN | 101866163 A | 10/2010 |
| CN | 101984379 A | 3/2011 |
| CN | 102029546 A | 4/2011 |
| CN | 103029131 A | 4/2013 |
| CN | 104540467 A | 4/2015 |
| CN | 104889829 A | 9/2015 |
| CN | 105388842 A | 3/2016 |
| CN | 105404236 A | 3/2016 |
| CN | 106325209 A | 1/2017 |
| CN | 106406228 A | 2/2017 |
| DE | 10 2016 116 523 A1 | 3/2017 |
| DE | 102015119240 B3 | 3/2017 |
| JP | 2006-255826 A | 9/2006 |
| JP | 2007-190628 A | 8/2007 |
| JP | 2010-54399 A | 3/2010 |
| JP | 2010-262474 A | 11/2010 |
| JP | 2011-95879 A | 5/2011 |
| JP | 2014-10687 A | 1/2014 |
| JP | 2014-164597 A | 9/2014 |
| JP | 2016-057843 A | 4/2016 |
| JP | 2016-78150 A | 5/2016 |
| JP | 2016-140899 A | 8/2016 |
| JP | 2017-013178 A | 1/2017 |
| JP | 2017-54463 A | 3/2017 |

OTHER PUBLICATIONS

An Office Action issued by the State Intellectual Property Office dated Apr. 2, 2019, which corresponds to Chinese Patent Application No. CN201810241571.2 and is related to U.S. Appl. No. 15/914,699 with English Translation.

An Office Action issued by the United States Patent and Trademark Office dated Mar. 22, 2019, which corresponds to U.S. Appl. No. 15/928,163 and is related to U.S. Appl. No. 15/914,699.

An Office Action issued by the United States Patent and Trademark Office dated Jun. 20, 2019, which corresponds to U.S. Appl. No. 15/952,487 and is related to U.S. Appl. No. 15/914,699.

An Office Action issued by the State Intellectual Property Office dated Jun. 3, 2019, which corresponds to Chinese Patent Application No. CN201810200632.0 and is related to U.S. Appl. No. 15/914,699 with English Translation.

Office Action issued by the U.S. Patent and Trademark Office dated Aug. 9, 2019, which corresponds to U.S. Appl. No. 15/947,981 and is related to U.S. Appl. No. 15/914,699.

An Office Action mailed by the State Intellectual Property Office of the People's Republic of China dated Aug. 15, 2019, which corresponds to Chinese Patent Application No. 201810325683.6 and is related to U.S. Appl. No. 15/914,699.

An Office Action mailed by the State Intellectual Property Office of the People's Republic of China dated Aug. 26, 2019, which corresponds to Chinese Patent Application No. 201810348993.X and is related to U.S. Appl. No. 15/914,699.

An Office Action mailed by the German Patent and Trademark Office dated Sep. 24, 2019, which corresponds to German Patent Application No. 102018002303.7 and is related to U.S. Appl. No. 15/914,699, with partial English language translation.

An Office Action mailed by the German Patent Office dated Apr. 1, 2020, which corresponds to related German Patent Application No. 102018205913.6; with partial English language translation.

\* cited by examiner

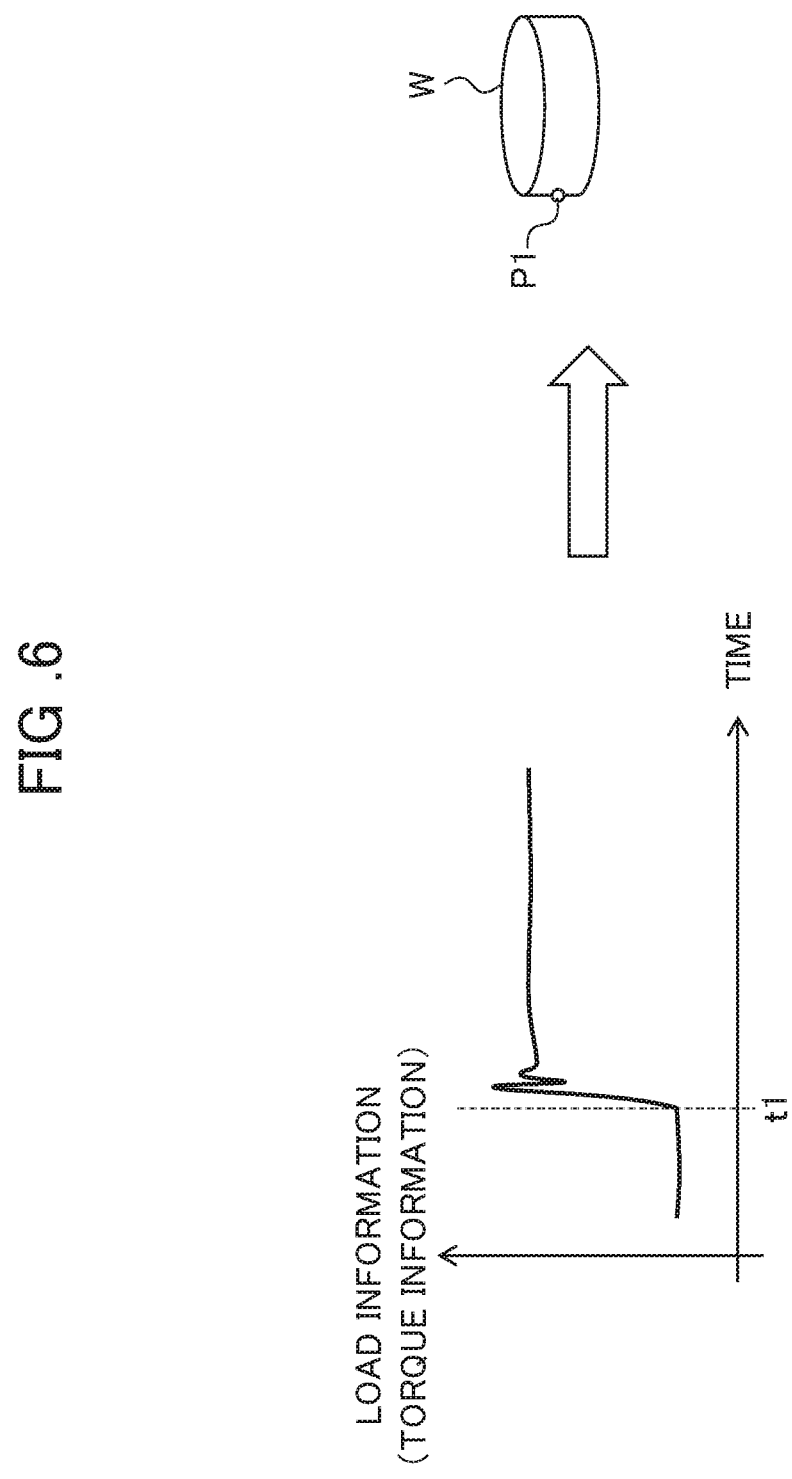

CONTROL SYSTEM OF MACHINE TOOL

This application is based on and claims the benefit of priority from Japanese Patent Application No. 2017-048903, filed on 14 Mar. 2017, the content of which is incorporated herein by reference.

BACKGROUND OF THE INVENTION

Field of the Invention

The present invention relates to the control system of a machine tool which machines a work.

Related Art

A machine tool machines a work while moving at least one of the work (the item to be machined) and a tool along predetermined drive axes. In other words, the machine tool machines the work while varying a relative position of the work and the tool.

When the work is machined with the machine tool described above, a stripe pattern (failure) may occur on the machined surface of the work due to vibration and so on. In other words, streaks or stripes may occur at predetermined intervals.

Hence, for example, Patent Documents 1 and 2 disclose technologies in which based on the movement path of the tip end of a tool when a work is machined, a stripe pattern (failure) on the machined surface of the work is detected.

Patent Document 1: Japanese Unexamined Patent Application, Publication No. 2016-57843
Patent Document 2: Japanese Unexamined Patent Application, Publication No. 2017-13178

SUMMARY OF THE INVENTION

The inventors et al. of the present application have attempted an approach different from the technologies disclosed in Patent Documents 1 and 2 in order to detect a failure on the machined surface of a work. Specifically, as another method of detecting the failure on the machined surface of the work, after the machining of the work, a vision sensor or the like is used to sense an image of the machined surface of the work, image processing is performed on the data of the sensed image and thus the failure on the machined surface and the location thereof are detected. Then, the inventors et al. of the present application have performed thorough examinations so as to find that if control data which controls drive axes when the failure occurs on the machined surface can be identified, this is useful for the analysis of the cause of the failure and examinations on measures therefor.

Hence, the present invention has an object to provide the control system of a machine tool which associates chronological drive axis control data when a work is machined and spatial work machined surface measurement data after the machining of the work with each other.

(1) A control system (for example, a numerical control system 100 of a machine tool which will be described later) of a machine tool according to the present invention which machines a work (W) includes: a control device (for example, a numerical control device 17 which will be described later) which controls the drive axis of the machine tool (for example, a machine tool 10 which will be described later) based on control data; a machined surface measurement device (for example, a machined surface measurement device 20 which will be described later) which measures the machined surface of the work; and a data processing device (for example, a data processing device 30 which will be described later), where the data processing device includes: a first acquisition portion (for example, a drive axis control data acquisition portion 31 which will be described later) which acquires, from the control device, the chronological control data when the work is machined; a second acquisition portion (for example, a machined surface measurement data acquisition portion 32 which will be described later) which acquires spatial machined surface measurement data after the machining of the work measured by the machined surface measurement device; and a data-associating processing portion (for example, a data-associating processing portion 34 which will be described later) which associates the chronological control data acquired by the first acquisition portion and the spatial machined surface measurement data acquired by the second acquisition portion with each other.

(2) In the control system of the machine tool according to (1), the control data may be position information of the drive axis of the machine tool, and the data-associating processing portion may produce a first work shape image based on the chronological position information, may produce a second work shape image based on the spatial machined surface measurement data and may associate the chronological position information and the spatial machined surface measurement data with each other so as to superimpose the first work shape image and the second work shape image on each other.

(3) In the control system of the machine tool according to (2), the chronological position information may be machine coordinate information, and the spatial machined surface measurement data may be machine coordinate information that is calculated based on a machine coordinate of the machined surface measurement device.

(4) In the control system of the machine tool according to (1), the control data may be torque information of the drive axis of the machine tool, and the data-associating processing portion may detect, based on a variation in the chronological torque information, as an edge position of the work, a machining start position and a machining completion position so as to produce a first work shape image, may detect, based on the spatial machined surface measurement data, an edge position of the work so as to produce a second work shape image, and may associate the chronological torque information and the spatial machined surface measurement data with each other so as to superimpose the edge position of the first work shape image and the edge position of the second work shape image on each other.

(5) In the control system of the machine tool according to (1), the control data may be torque information of the drive axis of the machine tool, and the data-associating processing portion may detect, based on a variation in chronological load information obtained by subtracting a torque part for acceleration/deceleration from the chronological torque information, as an edge position of the work, a machining start position and a machining completion position so as to produce a first work shape image, may detect, based on the spatial machined surface measurement data, an edge position of the work so as to produce a second work shape image, and may associate the chronological torque information and the spatial machined surface measurement data with each other so as to superimpose the edge position of the first work shape image and the edge position of the second work shape image on each other.

(6) In the control system of the machine tool according to any one of (1) to (5), the data processing device may further include: a machined surface failure detection portion (for example, a machined surface failure detection portion 35 which will be described later) which detects a failure on the machined surface of the work and a location thereof based on the spatial machined surface measurement data acquired by the second acquisition portion; and an identification portion (for example, a failure location control data identification portion 36 which will be described later) which identifies, based on the control data and the machined surface measurement data associated by the data-associating processing portion, control data of the failure location corresponding to the machined surface measurement data of the failure location detected by the machined surface failure detection portion.

(7) In the control system of the machine tool according to (6), the identification portion may associate information of the failure on the machined surface of the work and a direction of the machining based on the chronological control data of the failure location with each other.

(8) In the control system of the machine tool according to (6), the failure on the machined surface of the work may be a streak or a stripe.

(9) In the control system of the machine tool according to (7), the failure on the machined surface of the work may be a streak or a stripe, and the information of the failure may be a direction of the streak or the stripe.

(10) In the control system of the machine tool according to (1), the control data may be a command value or a feedback value, the command value may be a position command value, a speed command value or a torque command value and the feedback value may be a position feedback value, a speed feedback value or a current feedback value.

According to the present invention, it is possible to provide the control system of a machine tool which associates chronological drive axis control data when a work is machined and spatial work machined surface measurement data after the machining of the work with each other.

BRIEF DESCRIPTION OF THE DRAWINGS

FIG. 6 is a diagram schematically showing detection processing of the edge position of the work based on torque information.

DETAILED DESCRIPTION OF THE INVENTION

Figure 1:
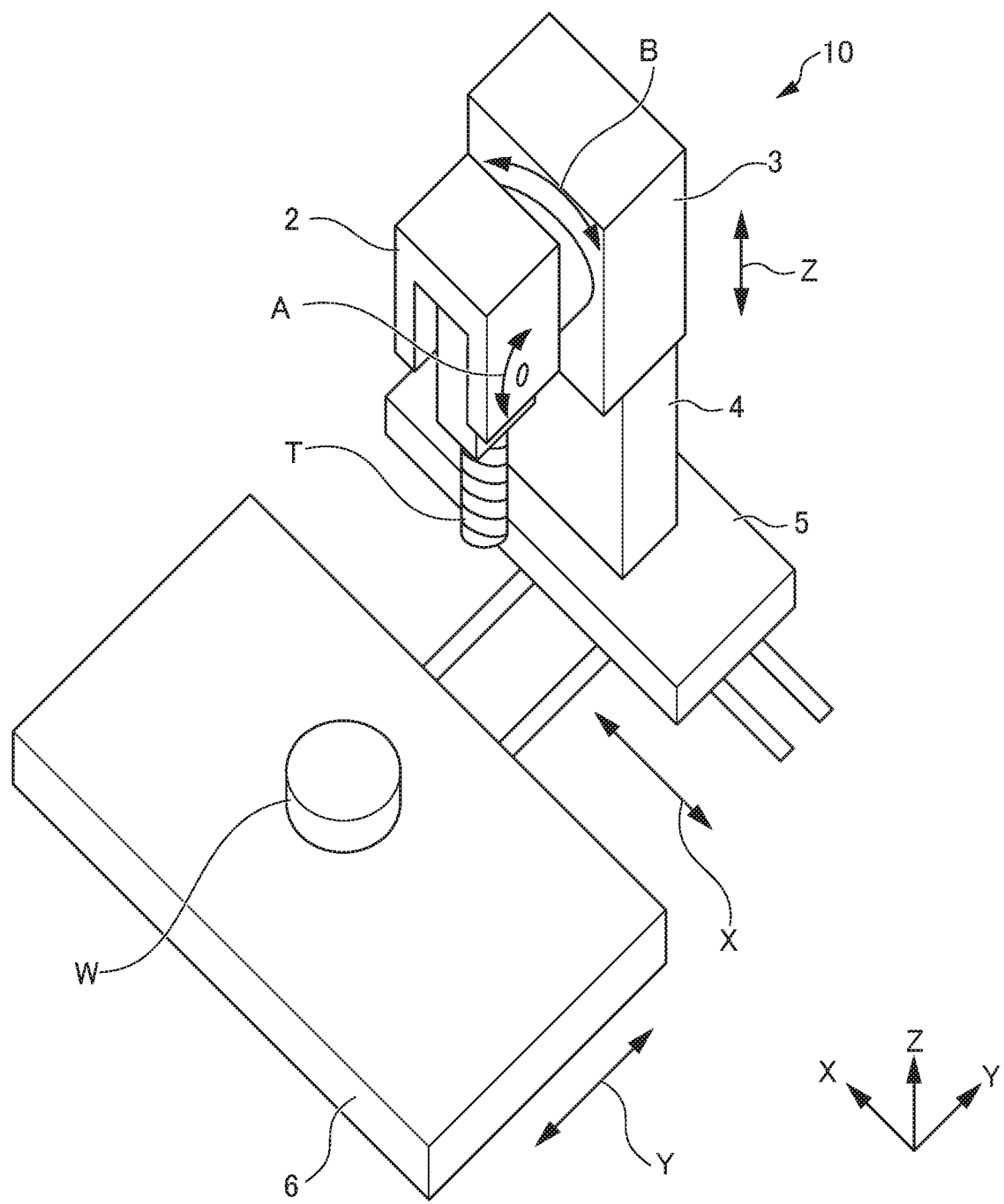
FIG. 1 is a perspective view showing an example of the configuration of a machine tool according to the present embodiment of the present invention.

Examples of the embodiment of the present invention will be described below with reference to accompanying drawings. In the drawings, the same or corresponding portions are identified with the same symbols.

(Machine Tool)

An example of a machine tool in a numerical control system according to the embodiment of the present invention will first be described. FIG. 1 is a perspective view showing an example of the configuration of the machine tool according to the present embodiment of the present invention. This machine tool 10 is a machine tool which performs machining (cutting). The machine tool in the numerical control system of the present invention is not limited to this machine tool, and may be an arbitrary industrial machine.

The machine tool 10 shown in FIG. 1 includes a head 2, a support member 3 which movably supports the head 2, a support column 4 which movably supports the support member 3, a base 5 which supports the support column 4, and a table 6. A tool T such as an end mill is fitted to the head 2, and a work W is mounted on the table 6. The machine tool 10 includes a drive device (unillustrated) and a numerical control device (unillustrated).

The drive device includes servomotors which will be described later. The drive device moves the base 5 in the direction of an X axis (arrow X), moves the table 6 in the direction of a Y axis (arrow Y) and moves the support member 3 in the direction of a Z axis (arrow Z). Furthermore, the drive device turns the tool T in the direction of an A axis (arrow A) with respect to the head 2, and turns the head 2 in the direction of a B axis (arrow B) with respect to the support member 3.

The numerical control device controls the drive device so as to control drive axes formed with the three directly moved axes (the X axis, the Y axis, and the Z axis) and the two rotation axes (the A axis and the B axis), and thereby controls the relative position of the tool T with respect to the work W and the posture thereof. In this way, the machine tool 10 machines the work W while changing the relative position of the tool T with respect to the work W and the posture thereof.

(Numerical Control System of Machine Tool)

Figure 2:
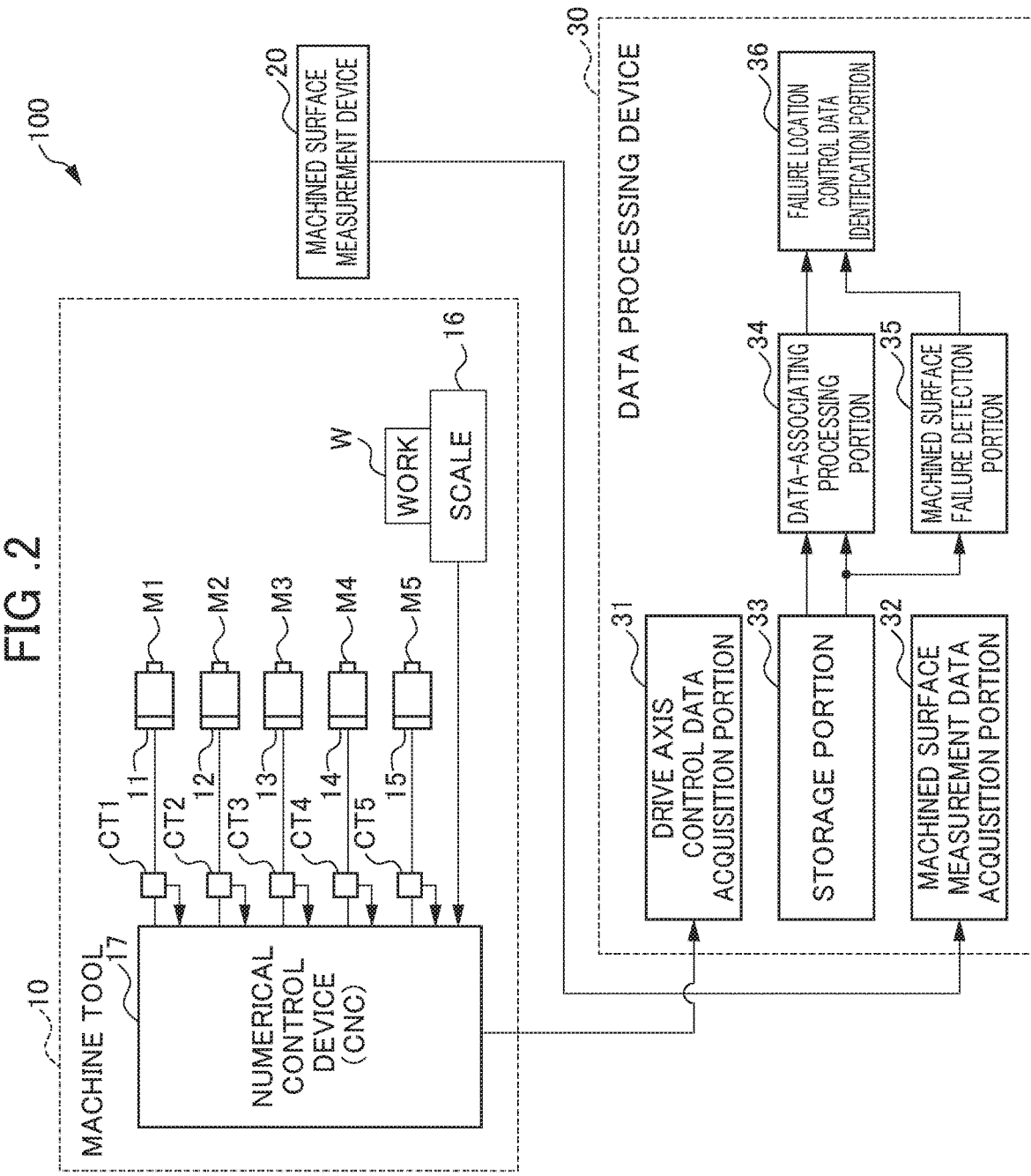
FIG. 2 is a diagram showing the configuration of a numerical control system in the machine tool according to the embodiment of the present invention.

Next, the numerical control system of the machine tool according to the embodiment of the present invention will be described. FIG. 2 is a diagram showing the configuration of the numerical control system in the machine tool according to the embodiment of the present invention. The numerical control system 100 of the machine tool shown in FIG. 2 includes the machine tool 10 described above, a machined surface measurement device 20 and a data processing device 30.

The machine tool 10 includes a plurality of servomotors M1 to M5 in the drive device described above, encoders (position/speed detectors) 11 to 15 which are respectively provided in the servomotors M1 to M5, current detectors CT1 to CT5, a scale (position detector) 16 and the numerical control device (CNC) 17. In FIG. 2, only the configuration of the machine tool 10 which is related to the characteristics of the present invention is shown, and other configurations are omitted.

The servomotors M1 to M5 respectively drive the drive axes (the X axis, the Y axis, the Z axis, the A axis and the B axis) described above by the control of the numerical control device 17. The encoders 11 to 15 respectively detect the rotation positions of the servomotors M1 to M5, and transmit the detected rotation positions to the numerical control device 17 as position feedback values. The encoders 11 to 15 respectively detect the rotation speeds of the servomotors M1 to M5, and transmit the detected rotation speeds to the numerical control device 17 as speed feedback values.

The current detectors CT1 to CT5 respectively detect the drive current values of the servomotors M1 to M5, and transmit the detected drive current values to the numerical control device 17 as current feedback values (actual current values and actual torque values).

For example, a scale 16 is provided in the table 6 on which the work W described above is mounted. The scale 16 detects the position of the work, and transmits the detected position to the numerical control device 17 as a position feedback value.

The numerical control device 17 generates torque command values (current command values) for the drive axes based on position command values (movement command values) of the drive axes based on a machining program related to the machining of the work W, the position feedback value from the scale 16 or the position feedback values from the encoders 11 to 15, the speed feedback values from the encoders 11 to 15, and the current feedback values from the current detectors CT1 to CT5, and drives the servomotors M1 to M5 with these torque command values.

Specifically, the numerical control device 17 includes a position command generation portion, a speed command generation portion and a torque command generation portion. The position command generation portion generates, based on the machining program stored in a storage portion, the position command values (movement command values) for the drive axes. The speed command generation portion generates speed command values for the drive axes based on differences between the position command values and the position feedback values. The torque command generation portion generates the torque command values (current command values) for the drive axes based on differences between the speed command values and the speed feedback values. The numerical control device 17 generates the drive currents for the drive axes based on differences between the torque command values (current command values) and the current feedback values.

The numerical control device 17 is formed with, for example, a computation processor such as a DSP (Digital Signal Processor) or an FPGA (Field-Programmable Gate Array). The various types of functions of the numerical control device 17 are realized by executing predetermined software (programs and applications) stored in the storage portion (unillustrated). The various types of functions of the numerical control device 17 may be realized by the cooperation of hardware and software or may be realized only by hardware (electronic circuit).

The machined surface measurement device 20 is a device which measures the work W so as to measure the machined surface of the work W. Specific examples of the machined surface measurement device 20 include a vision sensor, an optical microscope, a laser microscope or a three-dimensional coordinate measurement machine. The machined surface measurement device 20 transmits the measured image data or the position data of the work W to the data processing device 30. The machined surface measurement device 20 is provided in, for example, a measurement stage, a fixing stage or an end factor of a robot outside the machine tool 10. The machined surface measurement device 20 may also be incorporated in the machine tool 10.

The data processing device 30 is a device which processes the data acquired from the numerical control device 17 and the machined surface measurement device 20. The data processing device 30 includes a drive axis control data acquisition portion (first acquisition portion) 31, a machined surface measurement data acquisition portion (second acquisition portion) 32, the storage portion 33, a data-associating processing portion 34, a machined surface failure detection portion 35 and a failure location control data identification portion 36.

The drive axis control data acquisition portion 31 acquires, from the numerical control device 17, the chronological drive axis control data when the work W is machined. Specifically, the drive axis control data acquisition portion 31 acquires, as the drive axis control data, the position feedback values (the position information (machine information) of the drive axes) of the work W detected in the scale 16. The drive axis control data acquisition portion 31 may acquire, as the drive axis control data, the position feedback values (the position information (machine information) of the drive axes) of the servomotors M1 to M5 detected in the encoders 11 to 15 or may acquire the position command values (the position information (machine information) of the drive axes).

The machined surface measurement data acquisition portion 32 acquires the spatial machined surface measurement data after the machining of the work W measured on the machined surface measurement device 20. Specifically, the machined surface measurement data acquisition portion 32 acquires, as the machined surface measurement data, three-dimensional image data or position data (coordinate data). The machined surface measurement data acquisition portion 32 may acquire, as the machined surface measurement data, two-dimensional image data.

The storage portion 33 stores the chronological drive axis control data acquired by the drive axis control data acquisition portion 31 and the spatial machined surface measurement data measured by the machined surface measurement device 20. The storage portion 33 is, for example, a rewritable memory such as an EEPROM.

The data-associating processing portion 34 associates the chronological drive axis control data and the spatial machined surface measurement data stored in the storage portion 33 with each other. The details of the data-associating processing will be described later.

The machined surface failure detection portion 35 detects, based on the spatial machined surface measurement data stored in the storage portion 33, a failure (a streak or a stripe) of the machined surface of the work W and the location thereof.

The failure location control data identification portion 36 identifies, based on the drive axis control data and the machined surface measurement data associated with each other by the data-associating processing portion 34, the control data of the failure location corresponding to the machined surface measurement data of the failure location detected by the machined surface failure detection portion 35. The failure location control data identification portion 36 also associates the direction of the machined surface failure (a streak or a stripe) and the direction of machining based on the chronological control data of the failure location with each other.

The data processing device 30 is formed with, for example, a computation processor such as a DSP (Digital Signal Processor) or an FPGA (Field-Programmable Gate Array). The various types of functions of the data processing device 30 are realized by executing predetermined software (programs and applications) stored in the storage portion (unillustrated). The various types of functions of the data processing device 30 may be realized by the cooperation of hardware and software or may be realized only by hardware (electronic circuit).

The various types of functions of the data processing device 30 may be realized in the numerical control device 17 of the machine tool 10.

Figure 3:
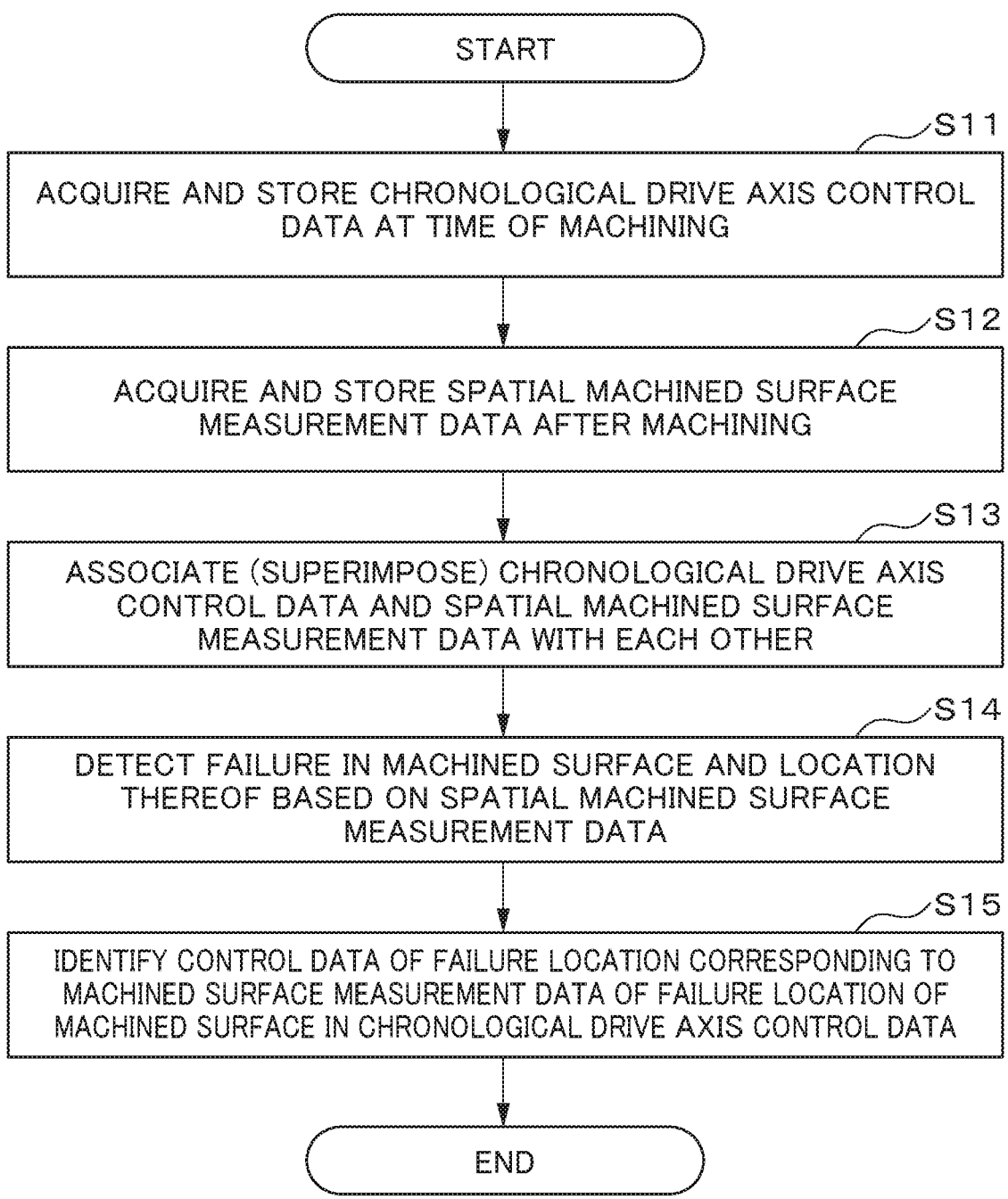
FIG. 3 is a flowchart showing data processing performed by the data processing device of the numerical control system in the machine tool according to the embodiment of the present invention.
Figure 4:
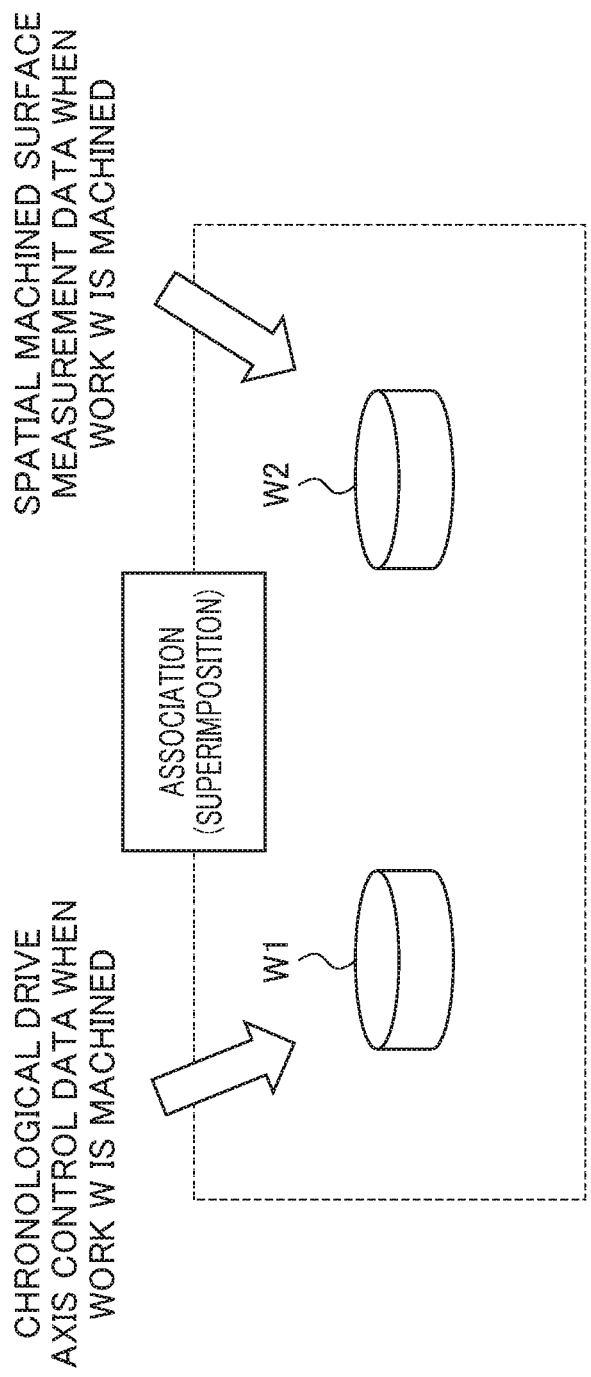
FIG. 4 is a diagram schematically showing data-associating processing.
Figure 5:
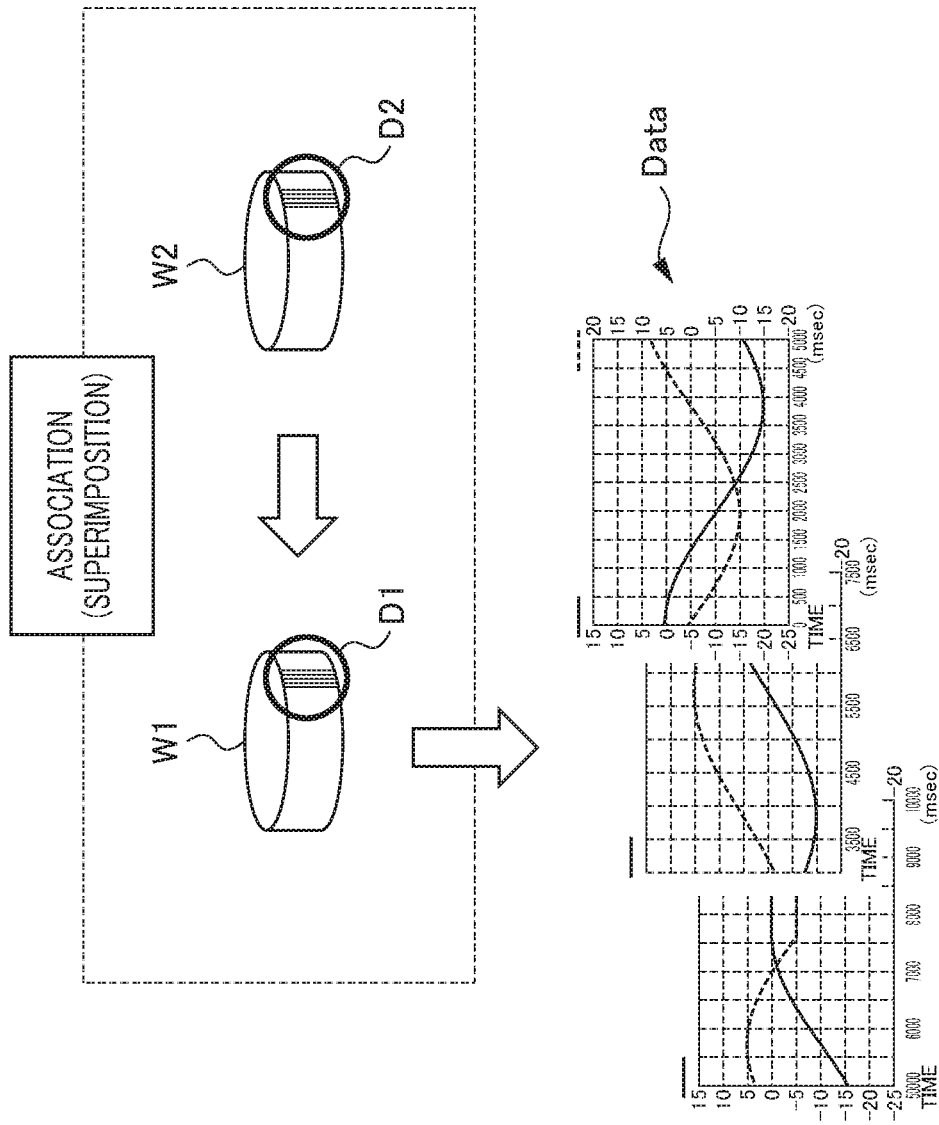
FIG. 5 is a diagram schematically showing identification processing on the control data of the location of a failure.

Next, the data processing performed by the data processing device 30 of the numerical control system 100 in the machine tool according to the present embodiment will be described with reference to FIGS. 3 to 5. FIG. 3 is a flowchart showing the data processing performed by the data processing device 30 of the numerical control system 100 in the machine tool according to the present embodiment. FIG. 4 is a diagram schematically showing the data-associating processing. FIG. 5 is a diagram schematically showing identification processing on the control data of the failure location.

When the work W is machined by the machine tool 10, the numerical control device 17 controls the drive axes based on the position command values, the speed command values, and the torque command values (current command values) of the drive axes, the position feedback values from the scale 16 (or the position feedback values from the encoders 11 to 15), the speed feedback values from the encoders 11 to 15, and the current feedback values (actual current values and actual torque values) from the current detectors CT1 to CT5, and thereby controls the relative position of the tool T with respect to the work W and the posture thereof.

When the work W is machined, in step S11, the drive axis control data acquisition portion 31 acquires the chronological drive axis control data from the numerical control device 17, and stores it in the storage portion 33. Specifically, the drive axis control data acquisition portion 31 acquires, as the drive axis control data, the position feedback values (the position information (machine information) of the drive axes) from the scale 16. The drive axis control data acquisition portion 31 may acquire the position feedback values (the position information (machine information) of the drive axes) from the encoders 11 to 15 or may acquire the position command values (the position information (machine information) of the drive axes).

When the machining of the work W is completed, the machined surface measurement device 20 measures the machined surface of the work W. Here, in step S12, the machined surface measurement data acquisition portion 32 acquires the spatial machined surface measurement data from the machined surface measurement device 20, and stores it in the storage portion 33. Specifically, the machined surface measurement data acquisition portion 32 acquires, as the machined surface measurement data, three-dimensional image data or position data (coordinate data).

Then, in step S13, the data-associating processing portion 34 associates the chronological drive axis control data and the spatial machined surface measurement data stored in the storage portion 33 with each other. Here, after the machining of the work, for example, the data of an image sensed by a vision sensor is three-dimensional data whereas the drive axis control data obtained from the numerical control device 17 when the work W is machined is chronological data, with the result that it is not easy to associate these types of data with each other. The inventors et al. of the present application use the following method in order to associate these types of data with each other.

Specifically, the data-associating processing portion 34 first converts the machined surface measurement data into machine coordinate data. For example, when the machined surface measurement device 20 is a vision sensor, the machined surface measurement data is image data. In this case, the data-associating processing portion 34 uses an image processing technology so as to determine the coordinate data of the work W from the image data. Then, the data-associating processing portion 34 converts the coordinate data of the work W into the machine coordinate data based on a distance between the machined surface measurement device 20 and the work W and the position (machine coordinates) and the angle (angle of view) of the machined surface measurement device 20. On the other hand, when the machined surface measurement device 20 is an optical microscope, a laser microscope or a three-dimensional coordinate measurement machine, the machined surface measurement data is position data (coordinate data). In this case, the data-associating processing portion 34 converts the position data (coordinate data) of the work W into the machine coordinate data based on the distance between the machined surface measurement device 20 and the work W and the position (machine coordinates) and the angle (angle of view) of the machined surface measurement device 20.

Then, the data-associating processing portion 34 associates the position feedback values (machine coordinates) which are the chronological drive axis control data when the work W is machined and the spatial position data (machine coordinates) of the machined surface after the machining of the work W with each other. For example, as shown in FIG. 4, the data-associating processing portion 34 produces a first work shape image W1 based on the position feedback values (machine coordinates) which are the chronological drive axis control data when the work W is machined. Likewise, the data-associating processing portion 34 produces a second work shape image W2 based on the spatial position data (machine coordinates) of the machined surface after the machining of the work W. Then, the data-associating processing portion 34 associates the chronological position feedback values and the spatial position data of the machined surface with each other so as to superimpose the first work shape image W1 and the second work shape image W2 on each other.

Then, in step S14, the machined surface failure detection portion 35 detects, based on the spatial machined surface measurement data stored in the storage portion 33, a failure (a streak or a stripe) on the machined surface of the work W and the location thereof. Specifically, when the machined surface measurement device 20 is a vision sensor, the machined surface measurement data is image data. In this case, the machined surface failure detection portion 35 detects the failure on the machined surface and the location thereof from the characteristic amount of streaks and stripes on the machined surface in the image data. On the other hand, when the machined surface measurement device 20 is an optical microscope, a laser microscope or a three-dimensional coordinate measurement machine, the machined surface measurement data is position data (coordinate data). In this case, the machined surface failure detection portion 35 detects the failure on the machined surface and the location thereof from a small variation (such as vibration) in the position of the machined surface in the position data (coordinate data).

Then, in step S15, as shown in FIG. 5, the failure location control data identification portion 36 identifies, based on the drive axis control data (the first work shape image W1) and the machined surface measurement data (the second work shape image W2) associated with each other by the data-associating processing portion 34, the control data of a failure location D1 corresponding to the machined surface measurement data of a failure location D2 detected by the machined surface failure detection portion 35.

The failure location control data identification portion 36 also associates the direction of the machined surface failure (a streak or a stripe) and the direction of machining based on the chronological control data of the failure location with each other.

As described above, in the numerical control system 100 of the machine tool according to the present embodiment, the data-associating processing portion 34 of the data processing device 30 can associate the chronological drive axis control data when the work is machined and the spatial work machined surface measurement data after the machining of the work with each other.

In the numerical control system 100 of the machine tool according to the present embodiment, the failure location control data identification portion 36 of the data processing device 30 identifies, in the chronological drive axis control data when the work is machined, failure location control data when a failure occurs on the machined surface of the work W. In this way, it is possible to utilize it for, for example, the analysis of the cause of the failure and examinations on measures therefor (for example, the gain adjustment of a control loop in the numerical control device).

In the numerical control system 100 of the machine tool according to the present embodiment, the failure location control data identification portion 36 of the data processing device 30 associates the direction of the machined surface failure (a streak or a stripe) and the direction of machining based on the chronological failure location control data with each other. In this way, it is possible to determine whether the failure is a failure (a streak or a stripe) intersecting the direction of machining or a failure (a streak or a stripe) parallel to the direction of machining, with the result that it is possible to utilize it for the analysis of the cause of the failure and examinations on measures therefor.

Second Embodiment

In the first embodiment, as the drive axis control data, the position information (machine coordinates) (position command values, position feedback values) is acquired from the numerical control device 17, and thus the control data of the position information when a failure occurs on the machined surface is identified. In a second embodiment, as the drive axis control data, torque information (torque command values (current command values), current feedback values (actual current values, actual torque values)) is acquired, and thus the control data of the torque information when a failure occurs on the machined surface is identified.

The configuration of the numerical control system 100 in the machine tool according to the second embodiment is the same as the configuration of the numerical control system 100 in the machine tool according to the first embodiment shown in FIGS. 1 and 2. In the numerical control system 100 in the machine tool according to the second embodiment, the functions and operations of the drive axis control data acquisition portion 31 and the data-associating processing portion 34 in the data processing device 30 differ from those of the drive axis control data acquisition portion 31 and the data-associating processing portion 34 in the data processing device 30 according to the first embodiment.

The drive axis control data acquisition portion 31 acquires, from the numerical control device 17, as the chronological drive axis control data when the work W is machined, the torque command values (the torque information of the drive axes), and stores them in the storage portion 33 (step S11 of FIG. 3). The drive axis control data acquisition portion 31 may acquire, as the drive axis control data, the current feedback values (actual current values, that is, actual torque values) (the torque information of the drive axes) detected by the current detectors CT1 to CT5.

Here, for example, the machine tool machines the entire work W while reciprocating the tool T with respect to the work W. Here, when the tool T makes contact with the work W and when the tool T is separated from the work W, the torque command values and the current feedback values are varied. In this way, the point of a variation in the torque command values or the point of a variation in the current feedback values is detected, and thus it is possible to detect the edge position of the work W, that is, the outline of the work W.

Since the torque command values and the current feedback values are also varied according to acceleration/deceleration, in the present embodiment, a value (load information) obtained by subtracting a torque value for acceleration/deceleration from the torque command values and the current feedback values is used. In this way, a return point when the tool T is reciprocated with respect to the work W is prevented from being erroneously detected as the edge position of the work W. When the tool T is not reciprocated with respect to the work W, the torque command values and the current feedback values may be used without being processed.

Specifically, as shown in FIG. 6, the data-associating processing portion 34 detects, based on the point t1 of a variation in the chronological load information obtained by subtracting a torque for acceleration/deceleration from the chronological torque command values, as the edge position P1 of the work W, a machining start position and a machining completion position, and thereby produces the first work shape (outline) image W1 as shown in FIG. 4. The data-associating processing portion 34 also detects, based on the spatial position data (machine coordinates) of the machined surface after the machining of the work W, the edge position of the work, and thereby produces the second work shape (outline) image W2 as shown in FIG. 4. Then, the data-associating processing portion 34 associates the chronological torque command values and the spatial position data of the machined surface with each other so as to superimpose the first work shape image W1 and the second work shape image W2 on each other (step S13 of FIG. 3).

Even in the numerical control system 100 of the machine tool according to the present embodiment, it is possible to obtain the same advantages as the numerical control system 100 according to the first embodiment.

The numerical control system 100 of the machine tool according to the present embodiment uses the edge position of the work without use of the machine coordinate data so as to associate the types of data with each other, and is thereby suitable for a case where the position of the machined surface measurement device 20 is not fixed and where the coordinate information of the machined surface measurement device 20 is not determined (for example, a case where a user performs shooting while carrying a vision sensor serving as the machined surface measurement device 20).

When the tool T makes contact with the work W and when the tool T is separated from the work W, the speed command values and the speed feedback values are also varied. Thus, in the second embodiment, as the drive axis control data, speed information (speed command values, speed feedback values) may be acquired from the numerical control device 17 such that based on a variation in the speed information, the control data of the speed information when a failure occurs on the machined surface is identified.

Although the embodiments of the present invention are described above, the present invention is not limited to the embodiments described above. The effects described in the present embodiments are simply those which are obtained by listing the most preferred effects produced from the present invention, and thus the effects of the present invention are not limited to those described in the present embodiments.

For example, although in the embodiments described above, the machined surface failure detection portion 35 of the data processing device 30 automatically detects a failure on the machined surface and the location thereof from the image data or the position data (coordinate data) of the work W (the machined surface) from the machined surface measurement device 20, they may be detected manually. For example, the measurement result (three-dimensional image data or position data) of the machined surface measurement device 20 may be displayed on a monitor or the like, a failure and the location thereof may be detected by the user and thus the detected failure location may be manually input into the data processing device 30.

EXPLANATION OF REFERENCE NUMERALS 2 head
3 support member
4 support column
5 base
6 table
10 machine tool
11 to 15 encoder
16 scale
17 numerical control device (control device)
20 machined surface measurement device
30 data processing device
31 drive axis control data acquisition portion (first acquisition portion)
32 machined surface measurement data acquisition portion (second acquisition portion)
33 storage portion
34 data-associating processing portion
35 machined surface failure detection portion
36 failure location control data identification portion
100 numerical control system (control system)
CT1 to CT5 current detector
M1 to M5 servomotor
T tool
W work

What is claimed is:

1. A control system of a machine tool which machines a work, the control system comprising:
a control device including a processor which controls a drive axis of the machine tool based on chronological control data;
a machined surface measurement device which measures a machined surface of the work; and
a data processing device,
wherein the data processing device includes another processor which:
acquires, from the control device, the chronological control data when the work is machined;
acquires spatial machined surface measurement data after the machining of the work measured by the machined surface measurement device; and
associates the acquired chronological control data and the acquired spatial machined surface measurement data with each other,
wherein the chronological control data is position information of the drive axis of the machine tool, and
the another processor of the data processing device:
produces a first work shape image based on chronological position information;
produces a second work shape image based on the spatial machined surface; and measurement data, and
wherein the associating comprises superimposing an edge position of the first work shape image and an edge position of the second work shape image on each other, and
wherein the another processor of the data processing device further:
detects a failure in machining process, on the machined surface of the work and a failure location based on the acquired spatial machined surface measurement data; and
identifies, based on the superimposed first and second work shape images, chronological control data, which is control data that controls the drive axis at the moment when the failure in machining process occurs.

2. The control system of the machine tool according to claim 1, wherein the chronological position information is machine coordinate information, and
the spatial machined surface measurement data is machine coordinate information which is calculated based on a machine coordinate of the machined surface measurement device.

3. A control system of a machine tool which machines a work, the control system comprising:
a control device including a processor which controls a drive axis of the machine tool based on chronological control data;
a machined surface measurement device which measures a machined surface of the work; and
a data processing device,
wherein the data processing device includes another processor which:
acquires, from the control device, the chronological control data when the work is machined;
acquires spatial machined surface measurement data after the machining of the work measured by the machined surface measurement device; and
associates the acquired chronological control data and the acquired spatial machined surface measurement data with each other,
the chronological control data is torque information of the drive axis of the machine tool, and
the another processor of the data processing device:
detects, based on a variation in chronological torque information, as an edge position of the work, a machining start position and a machining completion position so as to produce a first work shape image; and
detects, based on the spatial machined surface measurement data, an edge position of the work so as to produce a second work shape image, and
wherein the associating comprises superimposing the edge position of the first work shape image and the edge position of the second work shape image on each other, and
wherein the another processor of the data processing device further:

detects a failure in machining process, on the machined surface of the work and a failure location based on the acquired spatial machined surface measurement data; and identifies, based on the superimposed first and second work shape images, chronological control data, which is control data that controls the drive axis at the moment when the failure in machining process occurs.

4. A control system of a machine tool which machines a work, the control system comprising:

a control device including a processor which controls a drive axis of the machine tool based on chronological control data;

a machined surface measurement device which measures a machined surface of the work; and a data processing device, wherein the data processing device includes another processor which:

acquires, from the control device, the chronological control data when the work is machined;

acquires spatial machined surface measurement data after the machining of the work measured by the machined surface measurement device; and associates the acquired chronological control data and the acquired spatial machined surface measurement data with each other, the chronological control data is torque information of the drive axis of the machine tool, and the another processor of the data processing device:

detects, based on a variation in chronological load information obtained by subtracting a torque part for at least one of acceleration and deceleration from chronological torque information, as an edge position of the work, a machining start position and a machining completion position so as to produce a first work shape image; and detects, based on the spatial machined surface measurement data, an edge position of the work so as to produce a second work shape image and wherein the associating comprises superimposing the edge position of the first work shape image and the edge position of the second work shape image on each other, and wherein the another processor of the data processing device further:

detects a failure in machining process, on the machined surface of the work and a failure location based on the acquired spatial machined surface measurement data; and identifies, based on the superimposed first and second work shape images, chronological control data, which is control data that controls the drive axis at the moment when the failure in machining process occurs.

5. The control system of the machine tool according to claim 1, wherein the another processor of the data processing device associates information of the failure in machining process, on the machined surface of the work and a direction of the machining based on the identified chronological control data.

6. The control system of the machine tool according to claim 1, wherein the failure in machining process, on the machined surface of the work is a streak or a stripe.

7. The control system of the machine tool according to claim 5, wherein the failure in machining process, on the machined surface of the work is a streak or a stripe, and the information of the failure in machining process is a direction of the streak or the stripe.

8. The control system of the machine tool according to claim 1, wherein the chronological control data is a command value or a feedback value, the command value is a position command value, a speed command value, or a torque command value, and the feedback value is a position feedback value, a speed feedback value, or a current feedback value.

* * * * *